(12) United States Patent
Perianu et al.

(10) Patent No.: US 10,575,083 B2
(45) Date of Patent: Feb. 25, 2020

(54) NEAR FIELD BASED EARPIECE DATA TRANSFER SYSTEM AND METHOD

(71) Applicant: BRAGI GmbH, München (DE)

(72) Inventors: Vlad Perianu, München (DE); Peter Vincent Boesen, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/387,882

(22) Filed: Dec. 22, 2016

(65) Prior Publication Data

US 2017/0180843 A1 Jun. 22, 2017

Related U.S. Application Data

(60) Provisional application No. 62/270,668, filed on Dec. 22, 2015.

(51) Int. Cl.
*H04R 1/10* (2006.01)
*H04W 76/10* (2018.01)
*H04W 4/80* (2018.01)

(52) U.S. Cl.
CPC ......... *H04R 1/1041* (2013.01); *H04R 1/1016* (2013.01); *H04W 4/80* (2018.02); *H04W 76/10* (2018.02); *H04R 2420/07* (2013.01)

(58) Field of Classification Search
CPC .. H04R 1/1041; H04R 1/1016; H04R 1/1058; H04R 2420/07; G06F 3/165; H04W 4/008; H04W 76/02; H04W 4/80; H04W 76/10
USPC ......... 381/74, 374, 360, 151, 380; 455/90.3, 455/90.2, 73, 88; 713/186
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |

(Continued)

FOREIGN PATENT DOCUMENTS

| | | |
|---|---|---|
| EP | 1017252 A2 | 7/2000 |
| EP | 2903186 A1 | 8/2015 |

(Continued)

OTHER PUBLICATIONS

Announcing the $3,333,333 Stretch Goal (Feb. 24, 2014).

(Continued)

*Primary Examiner* — Vivian C Chin
*Assistant Examiner* — Con P Tran
(74) *Attorney, Agent, or Firm* — Goodhue, Coleman & Owens, P.C.

(57) ABSTRACT

A system, method and wireless earpieces for managing sharing performed by one or more wireless earpieces. User input is received to share data acquired by the one or more wireless earpieces. A determination is made whether a connection is established between the one or more wireless earpieces and a wireless device. The data is shared between the one or more wireless earpieces and the wireless device based on the user input and in response to the connection being established between the one or more wireless earpieces and the wireless device.

19 Claims, 4 Drawing Sheets

(56) References Cited

U.S. PATENT DOCUMENTS

| | | | |
|---|---|---|---|
| 4,865,044 | A | 9/1989 | Wallace et al. |
| 5,191,602 | A | 3/1993 | Regen et al. |
| 5,201,007 | A | 4/1993 | Ward et al. |
| 5,280,524 | A | 1/1994 | Norris |
| 5,295,193 | A | 3/1994 | Ono |
| 5,298,692 | A | 3/1994 | Ikeda et al. |
| 5,343,532 | A | 8/1994 | Shugart |
| 5,363,444 | A | 11/1994 | Norris |
| 5,497,339 | A | 3/1996 | Bernard |
| 5,606,621 | A | 2/1997 | Reiter et al. |
| 5,613,222 | A | 3/1997 | Guenther |
| 5,692,059 | A | 11/1997 | Kruger |
| 5,721,783 | A | 2/1998 | Anderson |
| 5,749,072 | A | 5/1998 | Mazurkiewicz et al. |
| 5,771,438 | A | 6/1998 | Palermo et al. |
| 5,802,167 | A | 9/1998 | Hong |
| 5,929,774 | A | 7/1999 | Charlton |
| 5,933,506 | A | 8/1999 | Aoki et al. |
| 5,949,896 | A | 9/1999 | Nageno et al. |
| 5,987,146 | A | 11/1999 | Pluvinage et al. |
| 6,021,207 | A | 2/2000 | Puthuff et al. |
| 6,054,989 | A | 4/2000 | Robertson et al. |
| 6,081,724 | A | 6/2000 | Wilson |
| 6,094,492 | A | 7/2000 | Boesen |
| 6,111,569 | A | 8/2000 | Brusky et al. |
| 6,112,103 | A | 8/2000 | Puthuff |
| 6,157,727 | A | 12/2000 | Rueda |
| 6,167,039 | A | 12/2000 | Karlsson et al. |
| 6,181,801 | B1 | 1/2001 | Puthuff et al. |
| 6,208,372 | B1 | 3/2001 | Barraclough |
| 6,275,789 | B1 | 8/2001 | Moser et al. |
| 6,339,754 | B1 | 1/2002 | Flanagan et al. |
| 6,408,081 | B1 | 6/2002 | Boesen |
| D464,039 | S | 10/2002 | Boesen |
| 6,470,893 | B1 | 10/2002 | Boesen |
| D468,299 | S | 1/2003 | Boesen |
| D468,300 | S | 1/2003 | Boesen |
| 6,542,721 | B2 | 4/2003 | Boesen |
| 6,560,468 | B1 | 5/2003 | Boesen |
| 6,654,721 | B2 | 11/2003 | Handelman |
| 6,664,713 | B2 | 12/2003 | Boesen |
| 6,694,180 | B1 | 2/2004 | Boesen |
| 6,718,043 | B1 | 4/2004 | Boesen |
| 6,738,485 | B1 | 5/2004 | Boesen |
| 6,748,095 | B1 | 6/2004 | Goss |
| 6,754,358 | B1 | 6/2004 | Boesen et al. |
| 6,784,873 | B1 | 8/2004 | Boesen et al. |
| 6,823,195 | B1 | 11/2004 | Boesen |
| 6,852,084 | B1 | 2/2005 | Boesen |
| 6,879,698 | B2 | 4/2005 | Boesen |
| 6,892,082 | B2 | 5/2005 | Boesen |
| 6,920,229 | B2 | 7/2005 | Boesen |
| 6,952,483 | B2 | 10/2005 | Boesen et al. |
| 6,987,986 | B2 | 1/2006 | Boesen |
| 7,136,282 | B1 | 11/2006 | Rebeske |
| 7,203,331 | B2 | 4/2007 | Boesen |
| 7,209,569 | B2 | 4/2007 | Boesen |
| 7,215,790 | B2 | 5/2007 | Boesen et al. |
| 7,463,902 | B2 | 12/2008 | Boesen |
| 7,508,411 | B2 | 3/2009 | Boesen |
| 7,983,628 | B2 | 7/2011 | Boesen |
| 8,140,357 | B1 | 3/2012 | Boesen |
| 9,544,689 | B2 * | 1/2017 | Fisher .................... H04R 5/04 |
| 9,579,060 | B1 * | 2/2017 | Lisy .................... A61B 5/6803 |
| 2001/0005197 | A1 | 6/2001 | Mishra et al. |
| 2001/0027121 | A1 | 10/2001 | Boesen |
| 2001/0056350 | A1 | 12/2001 | Calderone et al. |
| 2002/0002413 | A1 | 1/2002 | Tokue |
| 2002/0007510 | A1 | 1/2002 | Mann |
| 2002/0010590 | A1 | 1/2002 | Lee |
| 2002/0030637 | A1 | 3/2002 | Mann |
| 2002/0046035 | A1 | 4/2002 | Kitahara et al. |
| 2002/0057810 | A1 | 5/2002 | Boesen |
| 2002/0076073 | A1 | 6/2002 | Taenzer et al. |
| 2002/0118852 | A1 | 8/2002 | Boesen |
| 2003/0065504 | A1 | 4/2003 | Kraemer et al. |
| 2003/0100331 | A1 | 5/2003 | Dress et al. |
| 2003/0104806 | A1 | 6/2003 | Ruef et al. |
| 2003/0115068 | A1 | 6/2003 | Boesen |
| 2003/0125096 | A1 | 7/2003 | Boesen |
| 2003/0218064 | A1 | 11/2003 | Conner et al. |
| 2004/0070564 | A1 | 4/2004 | Dawson et al. |
| 2004/0160511 | A1 | 8/2004 | Boesen |
| 2005/0043056 | A1 | 2/2005 | Boesen |
| 2005/0125320 | A1 | 6/2005 | Boesen |
| 2005/0148883 | A1 | 7/2005 | Boesen |
| 2005/0165663 | A1 | 7/2005 | Razumov |
| 2005/0196009 | A1 | 9/2005 | Boesen |
| 2005/0251455 | A1 | 11/2005 | Boesen |
| 2005/0266876 | A1 | 12/2005 | Boesen |
| 2006/0029246 | A1 | 2/2006 | Boesen |
| 2006/0074671 | A1 | 4/2006 | Farmaner et al. |
| 2006/0074808 | A1 | 4/2006 | Boesen |
| 2008/0254780 | A1 | 10/2008 | Kuhl et al. |
| 2009/0017881 | A1 | 1/2009 | Madrigal |
| 2009/0154739 | A1 * | 6/2009 | Zellner ................ H04R 1/1041 381/311 |
| 2010/0320961 | A1 | 12/2010 | Castillo et al. |
| 2011/0003664 | A1 * | 1/2011 | Richard ............. A63B 24/0062 482/8 |
| 2011/0286615 | A1 | 11/2011 | Olodort et al. |
| 2014/0270227 | A1 | 9/2014 | Swanson |

FOREIGN PATENT DOCUMENTS

| | | |
|---|---|---|
| GB | 2074817 | 4/1981 |
| WO | 2014043179 A2 | 3/2014 |
| WO | 2015110577 A1 | 7/2015 |
| WO | 2015110587 A1 | 7/2015 |

OTHER PUBLICATIONS

BRAGI Is On Facebook (2014).
BRAGI Update—Arrival Of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready To Rumble, A Lot To Be Done Over Christmas (Dec. 22, 2014).
BRAGI Update—Memories From April—Update On Progress (Sep. 16, 2014).
BRAGI Update—Memories from May—Update On Progress—Sweet (Oct. 13, 2014).
BRAGI Update—Memories From One Month Before Kickstarter—Update On Progress (Jul. 10, 2014).
BRAGI Update—Memories From The First Month of Kickstarter—Update on Progress (Aug. 1, 2014).
BRAGI Update—Memories From The Second Month of Kickstarter—Update On Progress (Aug. 22, 2014).
BRAGI Update—New People @BRAGI—Prototypes (Jun 26, 2014).
BRAGI Update—Office Tour, Tour To China, Tour to CES (Dec. 11, 2014).
BRAGI Update—Status On Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back To China, Backer Day, On Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).

(56) References Cited

OTHER PUBLICATIONS

BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, On Track and Gems Overview.
BRAGI Update—Status On Wireless, Supply, Timeline and Open House@BRAGI(Apr. 1, 2015).
BRAGI Update—Unpacking Video, Reviews On Audio Perform and Boy Are We Getting Close(Sep. 10, 2015).
Hoffman, "How to Use Android Beam to Wirelessly Transfer Content Between Devices", (Feb. 22, 2013).
Last Push Before The Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash + The Charging Case & The BRAGI News (Feb. 21, 2014).
The Dash-A Word From Our Software, Mechanical and Acoustics Team + An Update (Mar. 11, 2014).
Update From BRAGI—$3,000,000—Yipee (Mar. 22, 2014).

\* cited by examiner

NEAR FIELD BASED EARPIECE DATA TRANSFER SYSTEM AND METHOD

PRIORITY STATEMENT

This application claims priority to U.S. Provisional Patent Application 62/270,668, filed on Dec. 22, 2015, and entitled Near Field Based Earpiece Data Transfer System and Method, hereby incorporated by reference in its entirety.

BACKGROUND

I. Field of the Disclosure

The illustrative embodiments relate to wireless earpieces. More specifically, but not exclusively, the illustrative embodiments relate to managing data sharing performed by wireless earpieces with other electronic devices.

II. Description of the Art

The growth of wearable devices is increasing exponentially. This growth is fostered by the decreasing size of microprocessors, circuit boards, chips, and other components. Wearable devices may track and record a number of different types of data corresponding to the user, user's activities, utilization of the wearable devices and so forth. Effectively sharing data may be difficult based on the size and accessibility of the wearable devices.

SUMMARY OF THE DISCLOSURE

One embodiment of the illustrative embodiments provides a system, method and wireless earpieces for managing sharing performed by one or more wireless earpieces. User input is received to share data acquired by the one or more wireless earpieces. A determination is made whether a connection is established between the one or more wireless earpieces and a wireless device. The data is shared between the one or more wireless earpieces and the wireless device based on the user input and in response to the connection being established between the one or more wireless earpieces and the wireless device. Another embodiment provides wireless earpieces including a processor and a memory storing a set of instructions. The set of instructions are executed to perform the method described.

Another embodiment provides a wireless earpiece. The wireless earpiece includes a frame for fitting in an ear of a user. The wireless earpiece also includes a logic engine controlling functionality of the wireless earpiece. The wireless earpiece also includes a number of sensors receiving biometric information from the user. The wireless earpiece also includes a transceiver communicating with at least a wireless device. The logic engine receives user input to share data acquired by the number of sensors or logic engine, determines whether a connection is established between the wireless earpiece and the wireless device, and shares the data between the wireless earpiece and the wireless device based on the user input and in response to the connection being established between the wireless earpiece and the wireless device.

BRIEF DESCRIPTION OF THE DRAWINGS

Illustrated embodiments of the present invention are described in detail below with reference to the attached drawing figures, which are incorporated by reference herein, and where.

DETAILED DESCRIPTION

The illustrative embodiments provide a system, method, and devices for managing data sharing performed utilizing wireless earpieces. The wireless earpieces may communicate with any number of all electronic devices, such as cell phones, laptops, tablets, entertainment systems, personal computers, vehicle systems, or so forth. In one embodiment, the user may provide feedback or user input to perform the data sharing. The sharing may also be performed automatically based on proximity, user preferences, connections available, settings, or other criteria.

The wireless earpieces may generate or track different data types. For example, the wireless earpieces may track information or data, such as biometric data corresponding to one or more users that wear the wireless earpieces, exercise or activity data, utilization data, music data, entertainment data, and so forth. The wireless earpieces may also track other types of data generated for or by the user.

The wireless earpieces may track data that may be particularly useful to groups, teams, organizations, families, or so forth. For example, the data may be used by a coach, physician, parent, or other concerned party to monitor the well-being of the user. The data may be utilized to make decisions or otherwise track and record important information (e.g., health or activity of the users). The illustrative embodiments allow the user to decide what data to share. In addition, the user decides the types of data, when to share data, and how much data to share with other users. The illustrative embodiments provide a number of interfaces, such as touch, proximity, voice command, gestures, motions, or so forth, to control the sharing performed by the wireless earpieces. The user may also control the data that is shared with the wireless earpieces from other external electronic devices. The transfers may occur utilizing any number of communications, standards, protocols, signals, or connections, such as near field communications, Bluetooth, Wi-Fi, cellular signals, or so forth. The illustrative embodiments allow for specific types of data or data packets to be shared. The illustrative embodiments save time and are much simpler than traditional screen based sharing systems and techniques.

Figure 1:
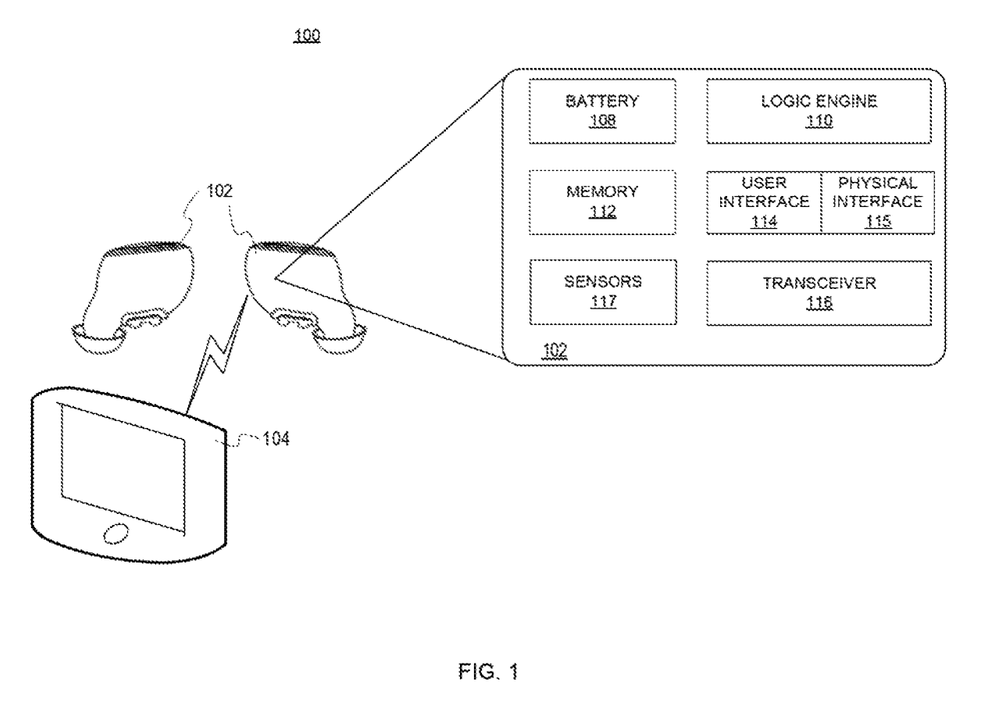
FIG. 1 is a pictorial representation of a wireless environment in accordance with an illustrative embodiment.

FIG. 1 is a pictorial representation of a wireless environment 100 in accordance with an illustrative embodiment. The wireless earpieces 102 may be configured to communicate with each other and with one or more wireless devices, such as a wireless device 104. The wireless earpieces 102 may be worn by a user and are shown separately from their positioning within the ears of the user for purposes of visualization. A block diagram of the wireless earpieces 102 is also shown to further illustrate components and operation of the wireless earpieces 102.

In one embodiment, the wireless earpieces 102 include a frame shaped to fit substantially within the ear of the user. The frame is a support structure that at least partially encloses and houses the electronic components of the wireless earpieces 102. The frame defines an extension configured to fit the inside of the ear of the user. The extension may be removable covered by one or more sleeves. The sleeves may have extremely tight tolerances to fit the user and one or more other users that may utilize the wireless earpieces during their expected lifecycle. In another embodiment, the sleeves may be custom built to support the interference fit utilized by the wireless earpieces 102 while also being comfortable while worn. In some applications, temporary adhesives or securing mechanisms (e.g., clamps, straps, extenders, etc.) may be utilized to ensure that the wireless earpieces 102 remain in the ears of the user even during the most rigorous and physical activities. For example, the wireless earpieces 102 may be utilized during water polo matches, football games, triathlons, or soccer matches. The wireless earpieces 102 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions.

The wireless earpieces 102 may determine their position with respect to each other as well as the wireless device 104. For example, position information for the wireless earpieces 102 and the wireless device 104 may determine proximity of the devices. For example, global positioning information or a signal strength/activity may be utilized to determine proximity and distance of the devices to each other in the wireless environment 100.

In one embodiment, the wireless earpieces 102 may be configured to take a number of measurements or log information during normal usage. The user may configure the wireless earpieces directly or through a connected device and app (e.g., mobile app with a graphical user interface) to store information, audio, images, and other data. Some examples of standard usage may include detecting and recording a heartbeat, active participation in a conversation, listening to music, or so forth.

In one embodiment, the wireless earpieces 102 may learn what data may be shared based on requests. For example, if the user typically requests that exercise data be shared with a number of devices/users, the wireless earpieces 102 may begin to automatically share that information when proximate the specified device/user and then audibly alert the user that such sharing has occurred. The sharing may also be performed through a cloud network when a communications connection is detected and validated. The wireless earpieces 102 may utilize historical information to generate thresholds, policies, or settings for determining when, how, and what data is shard.

In one embodiment, the wireless environment 100 may represent all or a portion of a personal area network. The wireless earpieces 102 may be utilized to control, communicate, manage, or interact with a number of other wearable devices or electronics, such as smart glasses, helmets, smart glass, watches or wrist bands, other wireless earpieces, chest straps, implants, displays, clothing, or so forth. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, Bluetooth, Z-Wave, ZigBee, Wi-Fi, ANT+ or other applicable radio frequency signals. In one embodiment, the personal area network may move with the user.

The wireless earpieces 102 may include any number of sensors for receiving user biometrics, such as pulse rate, blood oxygenation, temperature, calories expended, voice and audio output, position, and orientation (e.g., body, head, etc.). The sensors may also determine the user's location, position, velocity, impact levels, and so forth. The sensors may also receive user input and convert the user input into commands or selections made across the personal devices of the personal area network. For example, the user input detected by the wireless earpieces may include voice commands, head motions, finger taps, finger swipes, motions or gestures, or other user inputs sensed by the wireless earpieces. The user input may be determined by the wireless earpieces 102 and converted into commands that may be sent to one or more external devices, such as the wireless device 104 a tablet computer, or so forth.

In other embodiments, the wireless environment 100 may include any number of devices, components, or so forth that may communicate with each other directly or indirectly through a wireless (or wired) connection, signal, or link. The wireless environment 100 may include one or more networks and network components and devices (not shown), such as routers, servers, signal extenders, intelligent network devices, computing devices, or so forth. In one embodiment, the network of the wireless environment 100 represents a personal area network as previously disclosed. Communications within the wireless environment 100 may occur through the network or may occur directly between devices, such as the wireless earpieces 102 and the wireless device 104 or indirectly through a network, such as a Wi-Fi network. In one embodiment, the wireless environment 100 may communicate with or include a wireless network, such as a Wi-Fi, cellular (e.g., 3G, 4G, 5G, PCS, GSM, etc.), Bluetooth, or other short range or long range radio frequency network. The wireless environment 100 may also communicate with any number of hard wired networks, such as local area networks, coaxial networks, fiber-optic networks, network adapters, or so forth. Communications within the wireless environment 100 may be operated by one or more users, service providers, or network providers.

The wireless earpieces 102 may play, communicate, or utilize any number of alerts or communications to indicate that the wireless earpieces 102 are sharing data. For example, an alert may be played audibly to the user. For example, the user may be played an alert indicating "the wireless earpieces are sharing data with a wireless device named Pete's cell phone." The wireless earpieces 102 may also vibrate, flash, play a tone or other sound, or give other indications to the user that the wireless earpieces 102 are sharing data with another user or device. The wireless earpieces 102 may also communicate an alert to the wireless device 104 that shows up as a notification, message, or other indicator indicating the changed status of the wireless earpieces 102.

The wireless earpieces 102 as well as the wireless device 104 may include logic for automatically implementing data sharing in response to various conditions and factors of the wireless environment 100. As a result, the wireless earpieces 102 may be adapted to perform data manual or automatic sharing for types of data and with users and devices established by the user.

In one embodiment, the wireless device 104 may utilize short-range or long-range wireless communications to communicate with the wireless earpieces 102 through a wireless signal or devices of the wireless environment 100. For example, the wireless device 104 may include a Bluetooth and cellular transceiver within the embedded logical components. For example, the wireless signal may be a Bluetooth, Wi-Fi, Zigbee, Ant+, or other short range wireless communication.

The wireless device 104 may represent any number of wireless or wired electronic communications or computing devices, such as smart phones, laptops, desktop computers, control systems, tablets, displays, gaming devices, music players, personal digital assistants, vehicle systems, or so forth. The wireless device 104 may communicate utilizing any number of wireless connections, standards, or protocols (e.g., near field communications, Bluetooth, Wi-Fi, wireless Ethernet, etc.). For example, the wireless device 104 may be a touch screen cellular phone that communicates with the wireless earpieces 102 utilizing Bluetooth communications. The wireless device 104 may implement and utilize any number of operating systems, kernels, instructions, or applications that may make use of the available sharing data sent from the wireless earpieces 102. For example, the wireless device 104 may represent any number of android, iOS, Windows, open platforms, or other systems and devices. Similarly, the wireless device 104 or the wireless earpieces 102 may include a number of applications that utilize the user input, proximity data, biometric data, and other feedback from the wireless earpieces 102 to share applicable information and data, control the applications, play audible or tactile alerts, or make other selections.

As previously noted, FIG. 1 further illustrates a block diagram of the wireless earpieces 102. As noted, the components of the wireless earpieces 102 may be described collectively rather than individually. As shown, the wireless earpieces 102 may be wirelessly linked to a wireless device 104. For example, the wireless device 104 may represent a wireless tablet computer. User input and commands may be received from either the wireless earpieces 102 or the wireless device 104 for implementation on either of the devices of the wireless environment 100 (or other externally connected devices). As previously noted, the wireless earpieces 102 may be referred to or described herein as a pair (wireless earpieces) or singularly (wireless earpiece). The description may also refer to components and functionality of each of the wireless earpieces 102 collectively or individually.

In some embodiments, the wireless device 104 may act as a logging tool for receiving shared information, data, or measurements made by the wireless earpieces 102. For example, the wireless device 104 may share data from the wireless earpieces 102 in real-time. As a result, the wireless device 104 may be utilized to store, display, and synchronize shared data received from the wireless earpieces 102. For example, the wireless device 104 may display pulse, proximity, location, oxygenation, distance, calories burned, and so forth as measured by the wireless earpieces 102. The wireless device 104 may be configured to receive and display alerts that indicate conditions to share data have been met. For example, if the wireless earpieces 102 meet a distance threshold with the wireless device 104, the wireless earpieces 102 may automatically share pre-selected data to the wireless device 104 for display as an alert, message, or in-app communication. The wireless earpieces 102 and the wireless device 104 may have any number of electrical configurations, shapes, and colors and may include various circuitry, connections, and other components.

In one embodiment, the wireless earpieces 102 may include a battery 108, a logic engine 110, a memory 112, a user interface 114, a physical interface 115, a transceiver 116, and sensors 117. The wireless device 104 may have any number of configurations and include components and features as are known in the art.

The battery 108 is a power storage device configured to power the wireless earpieces 102. In other embodiments, the battery 108 may represent a fuel cell, thermal electric generator, piezo electric charger, solar charger, ultra-capacitor, or other existing or developing power storage technologies. The illustrative embodiments preserve the capacity of the battery 108 by efficiently performing data sharing to reduce battery utilization associated with constant sharing of data. For example, the wireless devices 102 may record a specified amount (e.g., time, data points, etc.) before sharing the data with the wireless device 104.

The logic engine 110 is the logic that controls the operation and functionality of the wireless earpieces 102. The logic engine 110 may include circuitry, chips, and other digital logic. The logic engine 110 may also include programs, scripts, and instructions that may be implemented to operate the logic engine 110. The logic engine 110 may represent hardware, software, firmware, or any combination thereof. In one embodiment, the logic engine 110 may include one or more processors. The logic engine 110 may also represent an application specific integrated circuit (ASIC) or field programmable gate array (FPGA). The logic engine 110 may utilize user input, user preferences and settings, conditions, factors, and environmental conditions to control sharing of data performed by the wireless earpieces 102. The wireless earpieces 102 may function separately or together to share data with externally connected devices.

In one embodiment, the logic engine 110 may share biometric data when a number of other preset wireless earpieces are detected as nearby (e.g., indicating a shared work, social, or gaming activity is occurring). The logic engine 110 may also share music and entertainment data with the wireless device 104 automatically where the wireless device 104 is operated by a parent of the user of the wireless devices 102 as a parental control and monitoring feature. In one embodiment, the user may activate an emergency mode to automatically share all applicable biometric information about the user including pulse rate, temperature, blood oxygenation, and so forth. In one embodiment, the wireless earpieces 102 may include an external display or speaker that may communicate information and data to third parties even when the wireless earpieces 102 are worn by the user. As a result, the wireless earpieces 102 may be utilized as an emergency monitoring tool. The wireless earpieces 102 may be configured to work together or completely independently based on the needs of the user.

The logic engine 110 may also process user input to determine commands implemented by the wireless earpieces 102 or sent to the wireless earpieces 102 through the transceiver 116. Specific actions may be associated with sharing settings, environmental conditions, proximity thresholds, and so forth. For example, the logic engine 110 may implement a macro allowing the user to share data when the wireless earpieces are proximate the wireless device 104.

In one embodiment, a processor included in the logic engine 110 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 112 is a hardware element device, or recording media configured to store data or instructions for subsequent retrieval or access at a later time. The memory 112 may represent static or dynamic memory. The memory 112 may include a hard disk, random access memory, cache, removable media drive, mass storage, or configuration suitable as storage for data, instructions, and information. In one embodiment, the memory 112 and the logic engine 110 may be integrated. The memory may use any type of volatile or non-volatile storage techniques and mediums. The memory 112 may store information related to the sharing status of a user, wireless earpieces 102, wireless device 104, and other peripherals, such as a wireless device, smart glasses, smart watch, smart case for the wireless earpieces 102, wearable device, and so forth. In one embodiment, the memory 112 may display instructions, programs, drivers, or an operating system for controlling the user interface 114 including one or more LEDs or other light emitting components, speakers, tactile generators (e.g., vibrator), and so forth. The memory 112 may also store thresholds, conditions, signal or processing activity, proximity data, and so forth.

The transceiver 116 is a component comprising both a transmitter and receiver which may be combined and share common circuitry on a single housing. The transceiver 116 may communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.), infrared, or other suitable radio frequency standards, networks, protocols, or communications. The transceiver 116 may also be a hybrid transceiver that supports a number of different communications. For example, the transceiver 116 may communicate with the wireless device 104 or other systems utilizing wired interfaces (e.g., wires, traces, etc.), NFC or Bluetooth communications. The transceiver 116 may also detect amplitudes and infer distance between the wireless earpieces 102 and external devices, such as the wireless device 104 or a smart case of the wireless earpieces 102.

The components of the wireless earpieces 102 may be electrically connected utilizing any number of wires, contact points, leads, busses, wireless interfaces, or so forth. In addition, the wireless earpieces 102 may include any number of computing and communications components, devices or elements which may include busses, motherboards, circuits, chips, sensors, ports, interfaces, cards, converters, adapters, connections, transceivers, displays, antennas, and other similar components. The physical interface 115 is hardware interface of the wireless earpieces 102 for connecting and communicating with the wireless device 104 or other electrical components, devices, or systems.

The physical interface 115 may include any number of pins, arms, or connectors for electrically interfacing with the contacts or other interface components of external devices or other charging or synchronization devices. For example, the physical interface 115 may be a micro USB port. In one embodiment, the physical interface 115 is a magnetic interface that automatically couples to contacts or an interface of the wireless device 104. In another embodiment, the physical interface 115 may include a wireless inductor for charging the wireless earpieces 102 without a physical connection to a charging device.

The user interface 114 is a hardware interface for receiving commands, instructions, or input through the touch (haptics) of the user, voice commands, or predefined motions. For example, the user interface 114 may include a touch screen, one or more cameras or image sensors, microphones, and so forth. The user interface 114 may be utilized to control the other functions of the wireless earpieces 102. The user interface 114 may include the LED array, one or more touch sensitive buttons or portions, a miniature screen or display, or other input/output components. The user interface 114 may be controlled by the user or based on commands received from the wireless device 104 or a linked wireless device. For example, the user may turn on, reactivate, or provide feedback utilizing the user interface 114.

In one embodiment, the user may provide feedback by tapping the user interface 114 once, twice, three times, or any number of times. Similarly, a swiping motion may be utilized across or in front of the user interface 114 (e.g., the exterior surface of the wireless earpieces 102) to implement a predefined action. Swiping motions in any number of directions or gestures may be associated with specific activities, such as share exercise data, share music playlist, share vitals, play music, pause, fast forward, rewind, activate a digital assistant (e.g., Siri, Cortana, smart assistant, etc.), or so forth without limitation. The swiping motions may also be utilized to control actions and functionality of the wireless device 104 or other external devices (e.g., smart television, camera array, smart watch, etc.). The user may also provide user input by moving his head in a particular direction or motion or based on the user's position or location. For example, the user may utilize voice commands, head gestures, or touch commands to change the content displayed by the wireless device 104. The user interface 114 may also provide a software interface including any number of icons, soft buttons, windows, links, graphical display elements, and so forth.

The sensors 117 may include pulse oximeters, accelerometers, gyroscopes, magnetometers, thermometers, inertial sensors, photo detectors, miniature cameras, and other similar instruments for detecting location, utilization, orientation, motion, and so forth. The sensors 117 may also be utilized to determine the biometric, activity, location, and speed measurements of the user. In one embodiment, the sensors 117 may store data that may be shared with other users and devices.

The wireless device 104 may include components similar in structure and functionality to those shown for the wireless earpieces 102. For example, the wireless device 104 may include any number of processors, batteries, memories, busses, motherboards, chips, transceivers, peripherals, sensors, displays, cards, ports, adapters, interconnects, and so forth. In one embodiment, the wireless device 104 may include one or more processors and memories for storing instructions. The instructions may be executed as part of an operating system, application, browser, or so forth to implement the features herein described. For example, the user may set sharing preferences for the wireless earpieces 102 utilizing the wireless device 104. In one embodiment, the wireless earpieces 102 may be magnetically or physically coupled to the wireless device 104 to be recharged or synchronized or to be stored.

The wireless device 104 may also execute an application with settings or conditions for save and utilize sharing settings. The user may adjust and program the settings including specified users, thresholds, activities, conditions, environmental factors, and so forth.

In another embodiment, the wireless device 104 may also include sensors for detecting the location, orientation, and proximity of the wireless earpieces 102 to the wireless device 104. The wireless earpieces 102 may turn off sharing to the wireless device 104 in response to losing a status or heart beat connection to preserve battery life and may only periodically search for a connection, link, or signal to the wireless device 104.

As originally packaged, the wireless earpieces 102 and the wireless device 104 may include peripheral devices such as charging cords, power adapters, inductive charging adapters, solar cells, batteries, lanyards, additional light arrays, speakers, smart case covers, transceivers (e.g., Wi-Fi, cellular, etc.), or so forth. In one embodiment, the wireless earpieces 102 may include a smart case (not shown). The smart case may include an interface for charging the wireless earpieces 102 from an internal battery or through a wall connection to the smart case. The smart case may also utilize the interface or a wireless transceiver to log utilization, biometric information of the user, and other information and data. The smart case may also be utilized to perform the sharing features, operations, and methods herein described.

Figure 2:
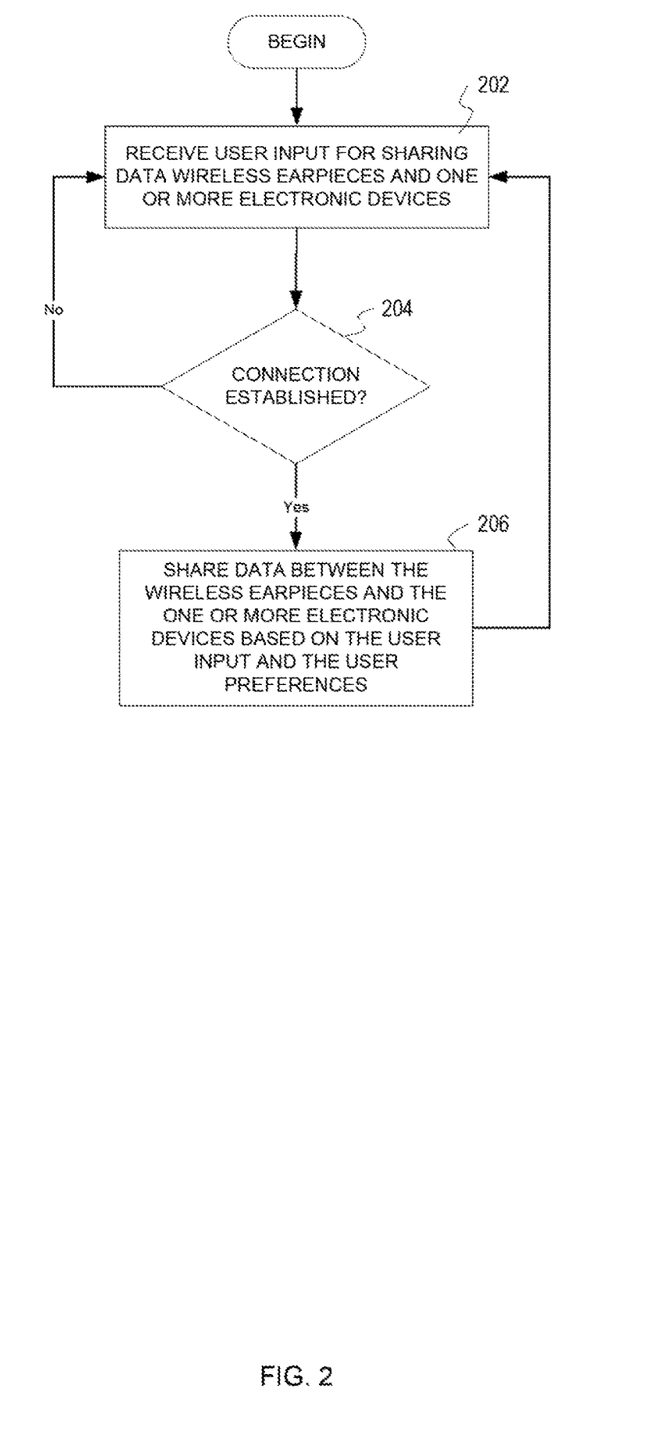
FIG. 2 is a flowchart of a process for managing data sharing of wireless earpieces in accordance with an illustrative embodiment.

FIG. 2 is a flowchart of a process for managing data sharing of wireless earpieces in accordance with an illustrative embodiment. The process of FIG. 2 may be implemented by one or more wireless earpieces individually or collectively, wearable devices, and any number of other electrical devices communicating directly or through a network. The wireless earpieces may communicate or be linked with any number of computing or communications devices.

In one embodiment, the process of FIG. 2 may begin by receiving user input for sharing data between wireless earpieces and one or more electronic devices (step 202). The user input may represent voice commands, tactile feedback (e.g., taps, head motions, etc.), gestures, or so forth. For example, the user may tap one of the wireless earpieces to share biometric data with a nearby cell phone where the biometric data is being actively tracked based on a user request or based on the default settings of the wireless earpieces. The user input may also represent other feedback, commands, or instructions received by the user. The user input may be provided by a user based on conditions, factors, or environments. For example, after running a marathon, a runner may want to share at least her pulse rate, blood oxygenation, miles ran, and calories burned with her personal trainer that is there to support her.

In one embodiment, the user input may represent preferences pre-established by the user. For example, the user may specify that any time, the wireless earpieces are linked with the user's cell phone, a log of biometric data is downloaded to the cell phone. The user input may also include other criteria, settings, or preferences (individually or in combination) that must be met to implement the sharing.

Next, the wireless earpieces determine whether a connection is established (step 204). The connection may represent a link or signal exchanged between the wireless earpieces and one or more electronic devices. For example, the connection may indicate that one or more of the wireless earpieces are within range of the one or more electronic devices. The wireless earpieces may be linked or communicate with each other (and with other electronic devices) utilizing any number of communications, standards, or protocols. For example, the wireless earpieces and the one or more electronic devices may be linked by a Bluetooth connection. The process may require that the devices be paired utilizing an identifier, such as a passcode, password, serial number, voice identifier, radio frequency, or so forth. In one embodiment, a matched pair of wireless earpieces may be automatically linked for utilization by a single user when manufactured and delivered. The wireless earpieces may be linked with the communications device and any number of other devices directly or through a network, such as a personal area network.

Whether the connection is established may be determined utilizing signal amplitude, status packets, error checking information, or other similar processes and communications, for determining that there is a secure and functional connection established. For example, errors or non-receipt of packets may indicate the distance between the devices is too significant or there is a severed connection. The proximity of the devices may be utilized along with a number of thresholds to perform the various determinations. If the wireless earpieces determine the connection is not established, the wireless earpieces return to step 202.

Next, the wireless earpieces share data between the wireless earpieces and the one or more electronic devices based on the user input and user preferences (step 206). The user may share all applicable data generated and tracked by the wireless earpieces, or selected data, datatypes, or data sets collected and recorded by the wireless earpieces. As a result, the wireless earpieces are configured to share data with other users and devices.

The data may be shared utilizing any number of short to long-range communications methods, standards, and protocols, such as near field communications, Bluetooth, AirDrop®, Wi-Fi, and developing communications systems and methods. In one embodiment, the data may be shared utilizing an encrypted connection or packets to ensure security of the information. However, any number of secured communication techniques and methods may be utilized to ensure that the data is sent to the correct authorized device and that the data is not easily intercepted and utilized by others.

Figure 3:
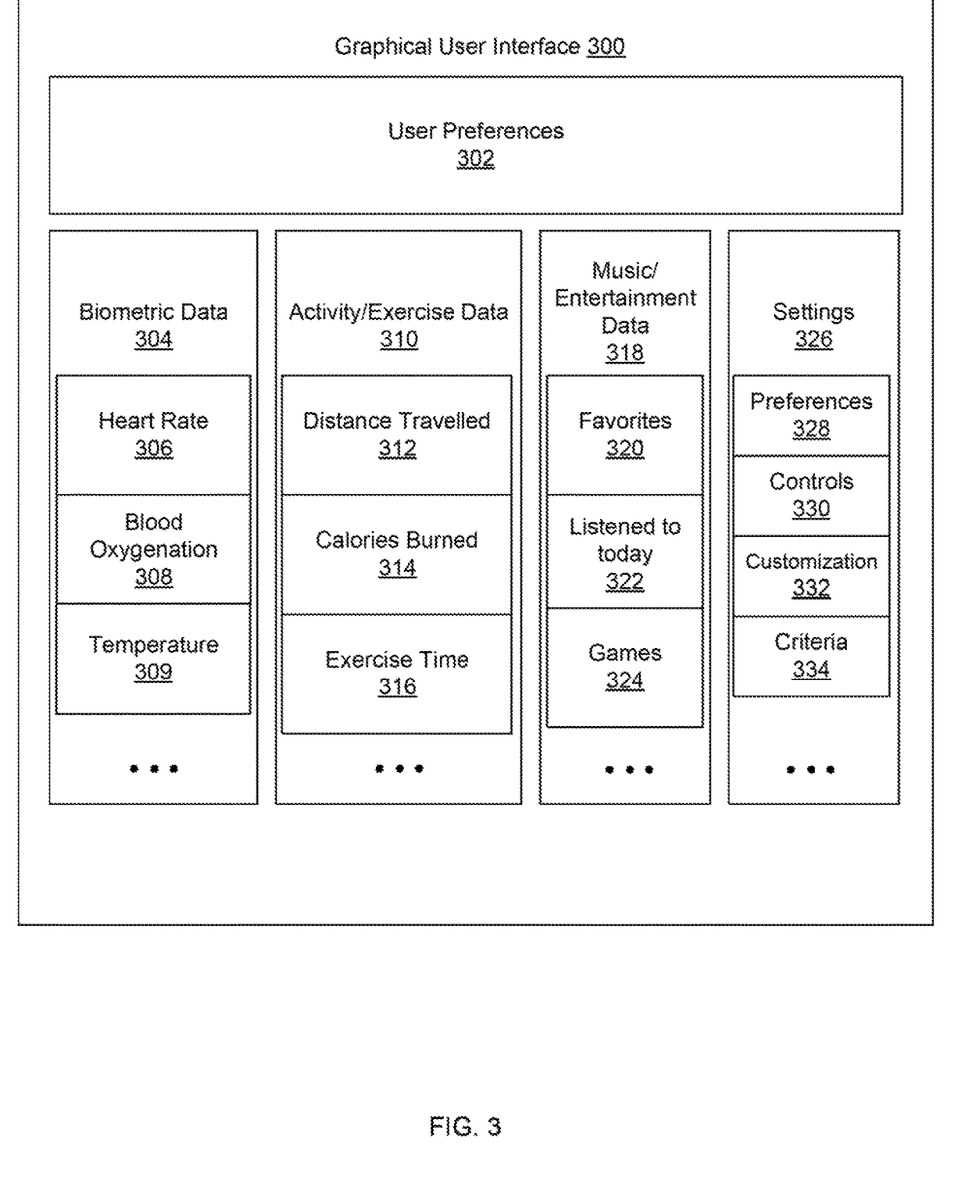
FIG. 3 is a graphical user interface for sharing data in accordance with an illustrative embodiment.

FIG. 3 is a graphical user interface 300 for sharing data in accordance with an illustrative embodiment. The graphical user interface 300 may be displayed by one or more computing or communications devices in communication with wireless earpieces. In another embodiment, the graphical user interface 300 may be presented to a user audibly by the wireless earpieces or other interconnected devices.

In one embodiment, the graphical user interface 300 may control how data is shared by one or more of the wireless earpieces. For example, the user may set user preferences 302 for controlling how different types of data including biometric data 304, activity/exercise data 310, and music/entertainment data 318 are utilized. The user preferences 302 may also specify settings 326 for controlling how and when data is shared, preferences, controls, and other conditions and rules. The data may be shared to stand-alone or network devices. For example, the data associated with the user preferences 302 and the associated sharing may be logged to one or more servers through a connection for access through a cloud network. The data associated with the user preferences 302 may represent both historical data (e.g., over minutes, hours, weeks, days, months, years) or may represent real-time data that is captured by the wireless earpieces and may be available to share in real-time.

The biometric data 304 may specify how and when biometric information, such as heart rate 306, blood oxygenation 308, and temperature 309 are shared. The biometric data 304 (as well as the other data recorded by the wireless earpieces) may be shared for health reasons, training or fitness, entertainment, or as part of social interaction. In one embodiment, the wireless earpieces may compile the biometric data 304 that may be automatically shared once a twice a day with a wireless device, such as a cell phone. An application of the cell phone may email or communicate the received biometric information to the user's doctor, trainer, social network site, friends, or so forth.

The activity/exercise data 310 may specify how activity and exercise data of the user is shared. The wireless earpieces may track and record data from walking, running, biking, swimming, and any number of land or water based sports. The data may be compiled for sharing automatically or based on the user request. Examples of the activity/exercise data 310 may include distance travelled 312, calories burned 314, exercise time 316, and any number of statistics and data associated with the user's activity and exercise.

The music/entertainment data 318 may specify how music and entertainment data of the user is shared. The user may make any number of choices or selections regarding music or audio listened to, audio games played, or so forth. For example, the music/entertainment data 318 may include favorites 320, music or videos listened to today 322, games 324, and other similar information. The music/entertainment data 318 may also include playlists or actual audio listened to by the user.

The settings 326 may specify preferences 328, controls 330, customization 332, and criteria 334 for sharing data. In one embodiment, the user may share or specify how the data is shared from the wireless earpieces. For example, if the user has chosen to not share certain types of information, a message or alert may be communicated to a device requesting that information.

The illustrative embodiments provide a system, method, personal area network, and wireless earpieces for managing data shared by the wireless earpieces individually or collectively. The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 4:
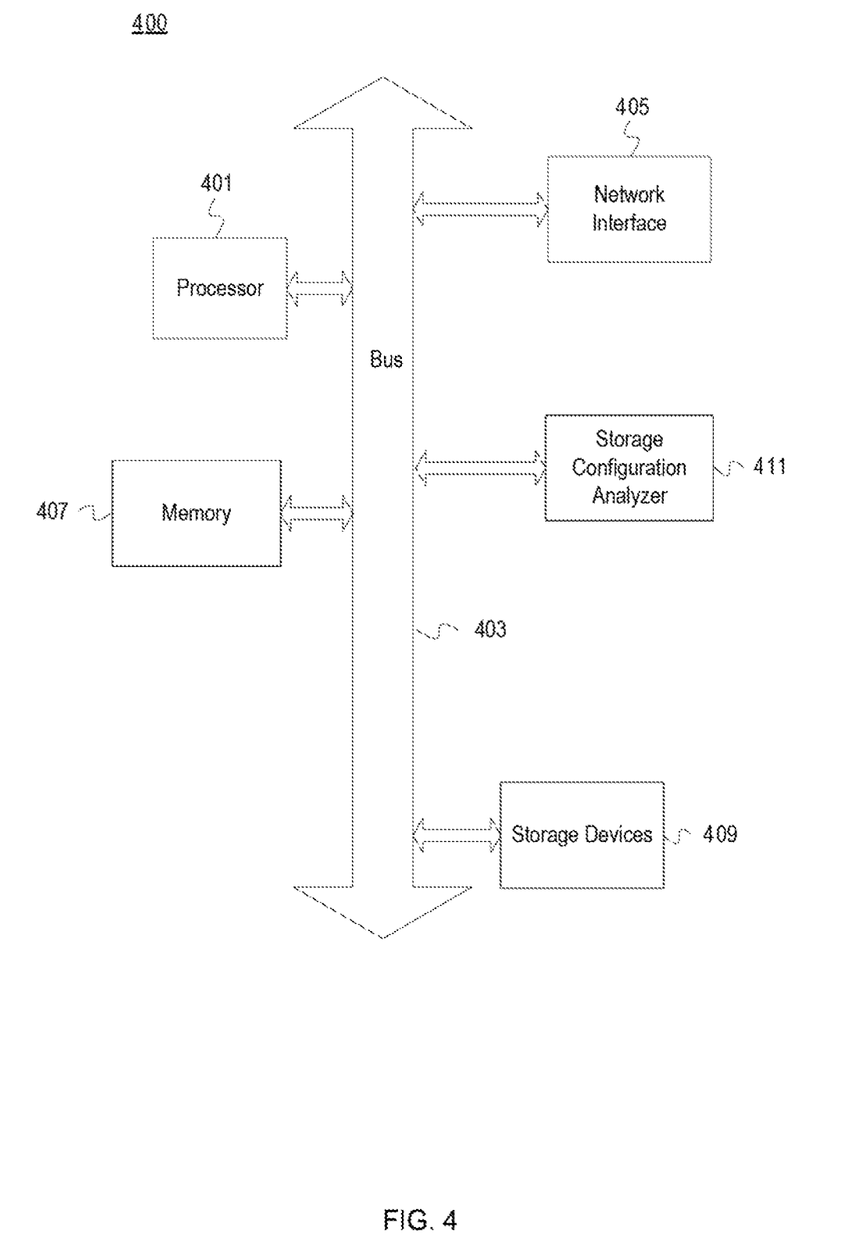
FIG. 4 depicts a computing system in accordance with an illustrative embodiment.

FIG. 4 depicts a computing system 400 in accordance with an illustrative embodiment. For example, the computing system 400 may represent a device, such as the computing device 104 of FIG. 1. The computing device 400 may be utilized to receive user settings, instructions, or feedback for controlling the power management features of the wireless earpieces together and separately. The computing system 400 includes a processor unit 401 (possibly including multiple processors, multiple cores, multiple nodes, and/or implementing multi-threading, etc.). The computing system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 embodies functionality to implement embodiments described above. The system memory 407 may include one or more functionalities that facilitate retrieval of the audio information associated with an identifier. Code may be implemented in any of the other devices of the computing system 400. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. For example, although shown in the context of ear buds, the wireless earpieces may take on any number of other forms and may be a part of headsets, over-the-ear, or other types of configurations. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for managing sharing performed by one or more wireless earpieces comprising:
   an earpiece housing for fitting in an ear of a user;
   a processor disposed within the earpiece housing controlling functionality of the wireless earpiece;
   a memory disposed within the earpiece housing and operatively connected to the processor;
   a plurality of sensors receiving biometric information from the user operatively connected to the processor;
   a transceiver communicating with at least a wireless device and operatively connected to the processor; and
   a user interface operatively connected to the processor for receiving user commands through touch, voice and/or gestures of the user, wherein the user commands include a first command to share data with the wireless device;
   the method comprising the step of:
   receiving the user commands of the user touch, the voice and/or the gesture through the user interface of the one or more wireless earpieces, wherein the user commands include the first command to share data acquired by the plurality of sensors of the one or more wireless earpieces;
   determining, at the processor, whether a connection is established between the one or more wireless earpieces and the wireless device; and
   sharing the data between the one or more wireless earpieces and the wireless device based on the first command to share data and in response to the connection being established between the one or more wireless earpieces and the wireless device to improve functionality of the one or more wireless earpieces.

2. The method of claim 1, wherein the user commands includes user preferences for automatically sharing the data from the one or more wireless earpieces.

3. The method of claim 1, wherein the data includes biometric data, activity data, and entertainment data.

4. The method of claim 1, wherein the sharing is performed in response to the user commands specifying a threshold distance for automatically sharing the data with the wireless device.

5. The method of claim 1, wherein the connection is a near field communication between the one or more wireless earpieces and the wireless device.

6. The method of claim 1, wherein the connection is a Bluetooth connection established between the one or more wireless earpieces and the wireless device.

7. The method of claim 1, further comprising:
   training the wireless earpieces to automatically share the data with designated wireless devices.

8. The method of claim 1, further comprising:
   searching for the connection to a plurality of authorized devices including the wireless device.

9. The method of claim 1, further comprising:
   ceasing the sharing of the data between the one or more wireless earpieces and the wireless device in response to a loss of status to improve power management.

10. A wireless earpiece, comprising:
    a wireless earpiece housing for fitting in an ear of a user;
    a processor disposed within the wireless earpiece housing for controlling functionality of the wireless earpiece;
    a plurality of sensors operatively connected to the processor receiving biometric information from the user;
    a transceiver operatively connected to the processor communicating with at least a wireless device;
    a user interface operatively connected to the processor for receiving user commands through touch or gestures of the user, wherein the user commands include a first command to share data with the wireless device;
    wherein the processor receives the user commands through the user touch or gesture to share data acquired by the plurality of sensors or the processor, determines whether a connection is established between the wireless earpiece and the wireless device, and transmits the data from the wireless earpiece to the wireless device and receives data from the wireless device based on the user input and in response to the connection being established between the wireless earpiece and the wireless device.

11. The wireless earpiece of claim 10, wherein the user commands include user preferences for automatically sharing the data from the wireless earpiece.

12. The wireless earpiece of claim 10, wherein the data includes biometric data, activity data, and entertainment data.

13. The wireless earpiece of claim 10, wherein the sharing of the data is performed in response to the user commands specifying a threshold distance for automatically sharing the data with the wireless device.

14. The wireless earpiece of claim 10, wherein the processor is trainable to automatically share the data with designated wireless devices.

15. The wireless earpiece of claim 10, wherein the transceiver searches for the connection to a plurality of authorized devices including the wireless device.

16. The wireless earpiece of claim 15, wherein the user input is associated with an emergency mode and the processor is further configured to share the biometric information with the plurality of authorized devices in response to receiving the user input.

17. A wireless earpiece comprising:
    a processor for executing an application; and
    a memory operatively connected to the processor for storing the application, wherein the application is executed to:
    receive user input through a user interface operatively connected to the processor to share data acquired by one or more sensors of the one or more wireless earpieces with a wireless device, wherein the user input is a gesture from a user and wherein the user input includes a first command to share data with the wireless device;
    determine, through the processor, whether a connection is established between a transceiver operatively connected to the processor of the one or more wireless earpieces and the wireless device; and
    share the data between the one or more wireless earpieces and the wireless device based on the user input, wherein the user input includes the first command to share data with the wireless device, and in response to the connection being established between the one or more wireless earpieces and the wireless device to improve functionality of the one or more wireless earpieces, wherein the shared data is coming from the one or more wireless earpieces and the wireless device.

18. The wireless earpieces of claim 17, wherein the user input includes user preferences for automatically sharing the data from the one or more wireless earpieces.

19. The wireless earpieces of claim 17, wherein the data includes biometric data, activity data, and entertainment data; wherein the sharing of the data is performed in response to the user input specifying a threshold distance for automatically sharing the data with the wireless device; wherein a set of instructions are further executed to train the wireless earpieces to automatically share the data with designated wireless devices.

* * * * *